United States Patent
Hendy et al.

(10) Patent No.: US 11,912,268 B2
(45) Date of Patent: Feb. 27, 2024

(54) VELOCITY REGRESSION SAFETY SYSTEM

(71) Applicant: Zoox, Inc., Foster City, CA (US)

(72) Inventors: Noureldin Ehab Hendy, West Lafayette, IN (US); Cooper Stokes Sloan, San Francisco, CA (US); Li Yon Tan, West Lafayette, IN (US); Feng Tian, Foster City, CA (US); Chuang Wang, Sunnyvale, CA (US)

(73) Assignee: ZOOX, INC., Foster City, CA (US)

( * ) Notice: Subject to any disclaimer, the term of this patent is extended or adjusted under 35 U.S.C. 154(b) by 431 days.

(21) Appl. No.: 17/246,412

(22) Filed: Apr. 30, 2021

(65) Prior Publication Data
US 2022/0363247 A1    Nov. 17, 2022

(51) Int. Cl.
*B60W 30/09*    (2012.01)
*B60W 10/18*    (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0956; B60W 2554/404; B60W 2554/80; B60W 2554/802; B60W 2554/804; B60W 30/0953; G08G 1/161; G08G 1/166; G01S 2013/9318; G01S 2013/93185; G01S 2013/9319; G01S 2013/93272; G01S 13/931
See application file for complete search history.

(56) References Cited

U.S. PATENT DOCUMENTS

2008/0312833 A1    12/2008  Greene et al.
2017/0369054 A1*  12/2017  Nishimura .......... B60W 30/095
(Continued)

FOREIGN PATENT DOCUMENTS

JP    2020154384 A    9/2020
KR    20190019744 A    2/2019
(Continued)

OTHER PUBLICATIONS

Gehrig, Mathias, et al. "Event-based angular velocity regression with spiking networks." 2020 IEEE International Conference on Robotics and Automation (ICRA). IEEE, 2020. (Year: 2020).*
(Continued)

*Primary Examiner* — Russell Frejd
*Assistant Examiner* — Ana D Thomas
(74) *Attorney, Agent, or Firm* — Lee & Hayes P.C.

(57) ABSTRACT

Techniques for accurately predicting and avoiding collisions with objects detected in an environment of a vehicle are discussed herein. A vehicle safety system can implement a model to output data indicating an intersection probability between the object and a portion of the vehicle in the future. The model may employ a rear collision filter, a distance filter, and a time to stop filter to determine whether a predicted collision may be a false positive, in which case the techniques may include refraining from reporting such predicted collision to other another vehicle computing device to control the vehicle.

20 Claims, 7 Drawing Sheets

(51) Int. Cl.
    *B60W 10/20*     (2006.01)
    *G08G 1/16*     (2006.01)
    *B60W 30/095*     (2012.01)

(52) U.S. Cl.
    CPC ......... *B60W 30/0956* (2013.01); *G08G 1/161* (2013.01); *B60W 2554/404* (2020.02); *B60W 2554/80* (2020.02)

(56) References Cited

U.S. PATENT DOCUMENTS

| | | | |
|---|---|---|---|
| 2018/0345958 A1* | 12/2018 | Lo | G08G 1/096725 |
| 2019/0187267 A1* | 6/2019 | Li | G01S 13/931 |
| 2019/0187269 A1* | 6/2019 | Tong | G01S 7/003 |
| 2019/0354782 A1* | 11/2019 | Kee | G06V 10/763 |
| 2021/0005086 A1 | 1/2021 | Cohen | |
| 2021/0407219 A1* | 12/2021 | Tammali | G08G 1/205 |

FOREIGN PATENT DOCUMENTS

| | | | |
|---|---|---|---|
| WO | WO-2017030493 A1 * | 2/2017 | ............ B60Q 1/525 |
| WO | WO2018222889 A1 | 12/2018 | |

OTHER PUBLICATIONS

Qin, Xiao, Kai Wang, and Chase E. Cutler. "Logistic regression models of the safety of large trucks." Transportation research record 2392.1 (2013): 1-10. (Year: 2013).*
(Korea Railroad Research Institute) Feb. 27, 2019 (Feb. 27, 2019) paragraphs [0060]-[0072], claim 3, and figures 1-7, 18 pages.
PCT Search Report and Written Opinion dated Sep. 19, 2022 for PCT application No. PCT/US2022/028397, 14 pages.
PCT International Preliminary Report on Patentability, dated Nov. 9, 2023 for PCT Application No.PCT/US2022/028397, 10 pages.

* cited by examiner

600 ⤺

(A)

↓

DETERMINE A TIME TO INITIATE AN ACTION BY THE
VEHICLE RELATIVE TO THE INTERSECTION POINT
612

↓

DETERMINE, BASED AT LEAST IN PART ON THE ANGLE,
THE INTERSECTION PROBABILITY, AND THE TIME, A
FALSE POSITIVE
614

— — — MODEL COMPONENT 104

↓

DETERMINE, BASED AT LEAST IN PART ON THE FALSE
POSITIVE, TO REFRAIN FROM INITIATING THE ACTION
616

— — — COMPUTING DEVICE 202

VELOCITY REGRESSION SAFETY SYSTEM

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle in the road, or the like. Perception systems utilize sensor data from sensors to "see" the environment which enables the planning systems to determine an effect of a detected object on a potential action for the vehicle. However, the complexity of such systems may cause preclusion of inspecting the reliability of such systems, especially as applied in ever more complicated scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
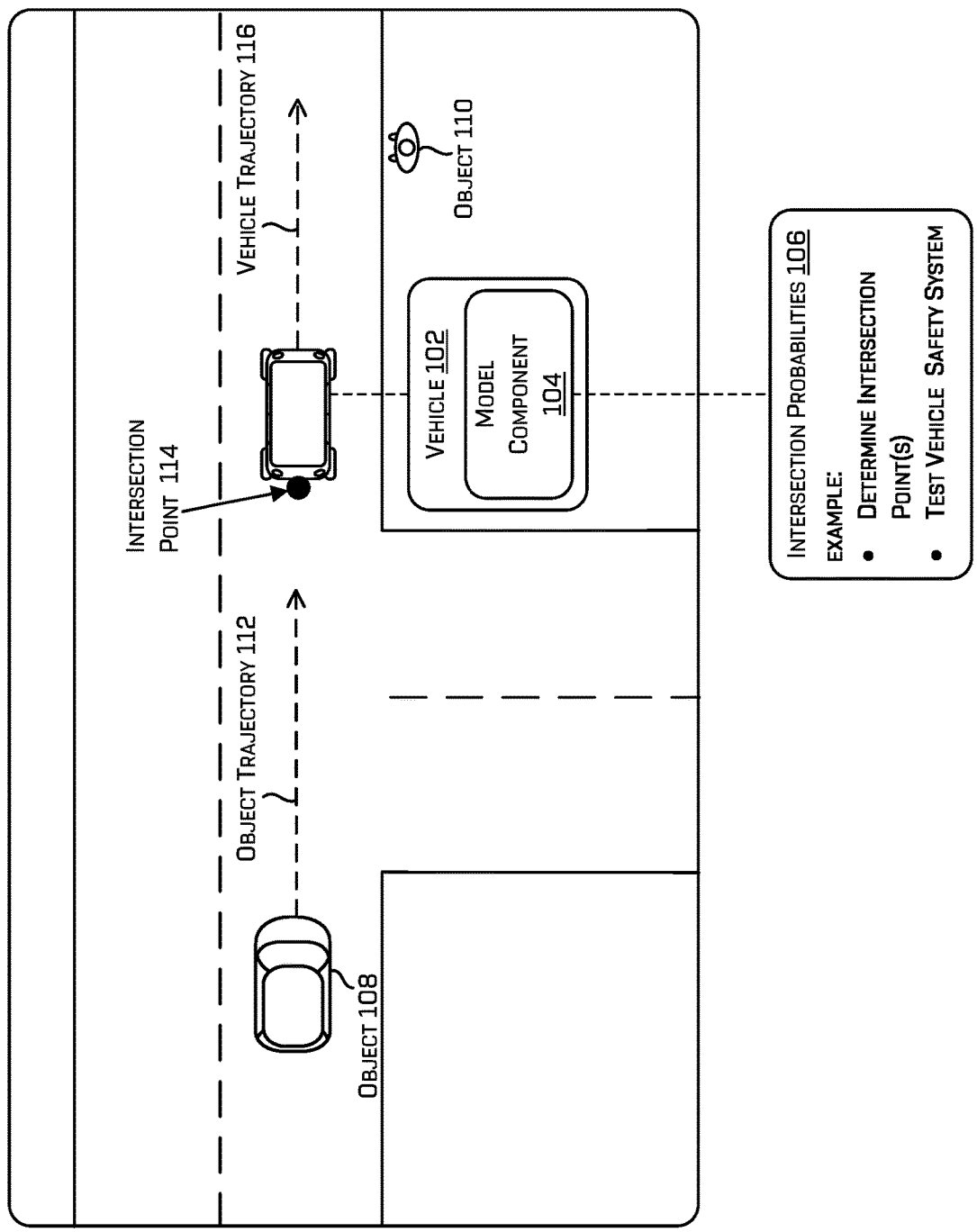
FIG. 1 is an illustration of an example environment, in which an example vehicle applies a model to predict an intersection value indicating a likelihood for collision with one or more example objects.

This disclosure relates to techniques for accurately predicting and avoiding collisions with objects detected in an environment of a vehicle. The vehicle may be an autonomous vehicle including one or more sensors to detect objects in the environment. The techniques can include a vehicle safety system that implements a model to output data indicating an intersection probability between the object and a portion of the vehicle in the future. In some examples, the model may employ a rear collision filter, a distance filter, and/or a report time filter to determine whether predicted collisions may be indicative of false positives. In those examples in which a false positive is determined, the techniques may include refraining from reporting such predicted collision to another vehicle computing device that is configured to control the vehicle. By implementing the model, prediction errors (e.g., a false positives) of the safety system can be reduced, thereby improving the overall safety of the vehicle by not reporting (e.g., sending a signal indicative of a potential collision associated with the object to the rear portion of the vehicle) to other components, for example. Further, the intersection probability from a model can be used to verify and/or validate predictions from the safety system to improve accuracy of the safety system, including quickly verifying that a trajectory of the vehicle will not result in an intersection with an object, thereby improving safety of the vehicle.

Generally, the model implemented by the safety system may provide functionality to generate data representing scenarios or interactions between a vehicle and potential objects in an environment in the future. For example, the model can determine an occupancy grid for an object proximate the vehicle in the future, which can be used to determine an area of the vehicle that may potentially intersect with an object. Further, the model can predict velocity information for object(s) and the vehicle, which can be used to determine a time for the vehicle to stop and/or accelerate to avoid the intersection. The model may also or instead determine an intersection probability between the object and the area of the vehicle at an intersection point in the future. In some examples, the model can refrain from sending an indication of a potential intersection to a vehicle computing device that is configured to control the vehicle while it navigates in the environment. In other examples, the model can send an indication of a potential intersection between the object and the area of the vehicle to the vehicle computing device based at least in part on the intersection probability and the time.

In some examples, outputs from the model may be used along with an occupancy prediction system configured to predict, based on the current state of the vehicle and object(s) in an environment, that there may be an intersection (e.g., a collision) at a point in the future. In examples of intersection(s) that are predicted between an object and the rear of the vehicle, the prediction may not account for subsequent decelerations or maneuvers that the object may take to avoid the collision. Accordingly, the rear collision filter, the distance filter, and/or the report time filter are implemented to account for the likelihood that there may be a collision (or that there may be little the vehicle can do if an object is predicted to collide with the rear of the vehicle) to reduce instances of false positive predictions of intersections.

In some examples, the techniques described herein can include a safety system that implements a model to determine whether to send intersection information (e.g., a potential intersection with an object in the environment and a rear portion of the vehicle) to a vehicle computing device that controls a vehicle (e.g., control a steering action, a braking action, an acceleration action, and so on). For instance, the vehicle computing device can receive the intersection information from the safety system for use in planning operations, such as determining a candidate trajectory for the vehicle. In various examples, the vehicle may receive indications of potential intersection(s) with object(s) usable by the vehicle to quickly and/or preemptively avoid objects, thereby improving safety of the vehicle. In some examples, the model can determine to not send an indication of a potential intersection to the vehicle computing device (e.g., such as the object intersecting with the rear of the vehicle) to reduce false positives which otherwise utilize computational resources to determine that the potential intersection did not occur or was unavoidable (e.g., the object speed was greater than the vehicle speed). Accordingly, implementing the techniques described herein can efficiently make use of available computational resources (e.g., memory and/or processor allocation or usage) while also improving accuracy of predictions.

In various examples, scenarios may be generated by a model that receives data representing object information (a speed of the object, an acceleration of the object, a yaw of the object, etc.) and/or vehicle information (e.g., a speed of the vehicle, a trajectory of the vehicle, etc.). The model may also determine an angle of the object relative to the vehicle based at least in part on the object information and the vehicle information. In such examples, the model may process the angle information to output data indicating a probability that the object and an area (e.g., a rear portion) of the vehicle intersect at an intersection point in the future. The model may also or instead determine a time to initiate an action (e.g., a braking action to cause the vehicle to brake, a steering action to cause the vehicle to steer, or an acceleration action to cause the vehicle to accelerate) by the vehicle relative to the intersection point. In some examples, the model may use the intersection probability and the time to determine whether to send an indication of a potential intersection with the area of the vehicle to the vehicle computing device.

The scenarios generated by the model can represent a scenario (e.g., a simulation) between one or more objects and the vehicle. In various examples, the model can determine a predicted velocity of the object and/or a velocity of the vehicle based at least in part on receiving top-down multi-channel data indicative of a top-down representation of an environment. The top-down representation may be determined based at least in part on map data and/or sensor data captured from or associated with a sensor of an autonomous vehicle in the environment, and may represent a top-down view of the environment to capture context of the autonomous vehicle (e.g., identify actions of other objects such as vehicles and pedestrians relative to the vehicle).

The model may also or instead determine a predicted velocity of the object, a velocity of the vehicle, and/or an intersection probability based at least in part on an occupancy grid comprising a plurality of grid points representing pixels in the environment. In various examples, the model can process the velocities of the object and the vehicle to determine a response to the scenario by a vehicle safety system. Additional details for determining intersection probabilities and/or intersection times are described herein, including in relation to FIGS. 2 and 3.

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine input data usable by the model to predict an intersection probability associated with the object.

In some examples, the vehicle may comprise a vehicle safety system implemented separately from the vehicle computing device for improved performance of the vehicle safety system, and/or to provide redundancy, error checking, and/or validation of determinations and/or commands determined by the vehicle computing device. However, in other examples, the vehicle safety system may be implemented as one or more components within the same vehicle computing device. Additional examples of a vehicle architecture comprising a primary computing system and a secondary computing system can be found, for example, in U.S. patent application Ser. No. 16/218,182 titled "Collision Avoidance System with Trajectory Validation" filed Dec. 12, 2018, U.S. patent application Ser. No. 16/232,863 titled "Collision Avoidance System" filed Dec. 26, 2018, and U.S. patent application Ser. No. 16/588,529 titled "Collision Avoidance Perception System" filed Sep. 30, 2019, the entirety of which are herein incorporated by reference in their entirety.

By way of example, the vehicle computing device may be considered to be a primary system, while the vehicle safety system may be considered to be a secondary system. The primary system may generally perform processing to control how the vehicle maneuvers within an environment. The primary system may implement various artificial intelligence (AI) techniques, such as machine learning, to understand an environment around the vehicle and/or instruct the vehicle to move within the environment. For example, the primary system may implement the AI techniques to localize the vehicle, detect objects around the vehicle, segment sensor data, determine classifications of the objects, predict object tracks, generate trajectories for the vehicle and the objects around the vehicle, and so on.

In some examples, the vehicle safety system may operate as a separate system that receives input data (e.g., perception data) based on the sensor data and AI techniques implemented by the primary system (e.g., vehicle computing device), and may perform various techniques described herein for improving collision prediction and avoidance by a vehicle. By way of example and not limitation, to enable the vehicle to respond quickly and accurately to objects, the model may send intersection information (e.g., intersection data) to a planning component configured to plan or otherwise determine a trajectory for the vehicle and/or to a perception component configured to sense the environment. In this way, intersection information from the model can be considered during planning operations (e.g., to avoid the object) and/or during perception operations (e.g., to direct one or more sensors to capture a different level of perception for an object).

A vehicle computing device may allocate an amount of memory, a type of memory, and/or a memory location to make the best use of available memory resources to models that predict possible intersections between object(s) and the vehicle. In some examples, models may make use of memory resources that are remote from the vehicle (e.g., a remote server or a remote vehicle).

In some examples, a model may define processing resources (e.g., processor amount, processor cycles, processor cores, processor location, processor type, and the like) to use to predict intersection probabilities and/or a time to report a potential intersection with the vehicle. A vehicle computing device that implements a model may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, models may predict intersection values by processing the object using a GPU, CPU, or a combination thereof. In this way, the model may be defined to utilize the processing resources that enable the model to perform predictions in the least amount of time (e.g., to use the intersection values in planning considerations of the vehicle). Accordingly, a model may make the best use of available processing resources and enable more predictions that may improve how a vehicle navigates in relation to the objects.

As described herein, models may be representative of machine learned models, statistical models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions. In one specific example, the model can be a machine learned model implementing a single convolutional neural network layer.

The techniques discussed herein can improve a functioning of a computing device of a vehicle in a number of ways. For example, the model may act as an attention system (e.g., a vehicle safety system and/or a redundancy to an existing perception component) that decreases false positives, prevents unneeded actions by the vehicle, and/or improves predictions related to the behavior of the vehicle. In some examples, the model improve functioning and safety of the vehicle by preventing the vehicle from taking additional actions that are not required based on conditions in the environment around the vehicle. In addition, the techniques described herein can improve passenger comfort and/or vehicle safety such as, for example, avoiding sudden braking or swerving when not needed. The techniques can include the model optimizing available computational resources by performing operations that limit the impact on the available resources (as compared to not implementing the model). Utilizing intersection data by a vehicle computing device, for instance, can improve the accuracy and/or reduce a latency for the vehicle to respond to a potential collision in the environment.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an autonomous vehicle (vehicle 102) in an environment 100, in which an example intersection model (model component 104) may determine one or more intersection probabilities (intersection probabilities 106). A vehicle computing device (e.g., vehicle computing device 504) and/or a vehicle safety system (e.g., vehicle safety system 534) may implement the intersection model of the vehicle 102. While described as a separate system, in some examples, intersection techniques described herein may be implemented by other vehicle systems, components, and/or computing devices. For example, and as will be described in further detail with regard to FIG. 5, the intersection information techniques described herein may be implemented at least partially by or in association with a localization component 520, a perception component 522, and/or a planning component 524.

In various examples, the vehicle safety system may be configured to receive sensor data representing object(s) of the environment 100, such as via a perception component (e.g., the perception component 522). In some examples, the vehicle safety system may detect, infer, estimate, or otherwise determine object state data representing characteristics of the object in the environment 100. For example, such state data may comprise position, velocity, acceleration, size, semantic type, etc. In some examples, the sensor(s) may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors mounted in the environment 100. In various examples, the vehicle 102 may be configured to transmit and/or receive data from other autonomous vehicles. The data may include sensor data and/or state data, such as sensor data associated with the environment 100.

In some examples, the vehicle safety system may be configured to detect an object in the environment 100, such as object 108 (e.g., a vehicle) and object 110 (e.g., a pedestrian). In some examples, the vehicle safety system may be configured to receive, detect, infer, estimate, or otherwise determine one or more paths for each detected object. As shown in FIG. 1, the object 108 is associated with an object trajectory 112 determined by the vehicle safety system (e.g., using the model component 104 or another model). In some examples, the model component 104 may receive path information and/or probabilities associated with the object trajectory 112 from a machine learned model.

In some examples, the model component 104 may determine an intersection point 114 for one or more paths (e.g., the object trajectory 112 or other object trajectory) associated with the vehicle 108. In such examples, the intersection point 114 output by the model component 104 may indicate a potential intersection between the vehicle 108 and a region of the vehicle 102. For instance, the intersection point 114 may be associated with a rear region, a front region, or a side region of the vehicle 102 as the vehicle 102 uses a vehicle trajectory 116 to navigate in the environment 100. In various examples, data output by the model component 104 can indicate a likelihood that the vehicle 108 intersects with a rear region of the vehicle 102.

In some examples, a vehicle computing device may control the vehicle 102 in the environment based at least in part on one or more intersection probabilities 106 (e.g., determine an action to avoid the objects in the environment). For instance, the model component 104 may provide functionality of an attention system (e.g., a computing system in addition to a main computing system which may provide additional and/or redundant safety systems) for the vehicle 102 by identifying objects most likely to cause an intersection and communicating intersection information about the identified objects to other components of the vehicle computing device. Accordingly, the intersection probability (e.g., a likelihood of an intersection between object(s) and the vehicle) may be taken into account in operations (e.g., simulations, estimated states, interaction modeling, collision estimation, etc.) or other vehicle control planning operation (e.g., as determined by a planning component) to quickly and/or preemptively avoid objects, thereby improving safety of the vehicle. Additional detail for determining and utilizing intersection probabilities 106 are discussed throughout this disclosure.

In various examples, the model may provide an output representing an intersection probability based at least in part on different types of input data. To illustrate, consider the following non-limiting example in which a vehicle navigates an environment and detects potential objects in the environment. In such an example, the model component 104 may receive input data representing object state data (e.g., position data, orientation data, heading data, velocity data, speed data, acceleration data, yaw rate data, or turning rate data associated with the object) and/or vehicle state data (e.g., position data, orientation data, heading data, velocity data, speed data, acceleration data, yaw rate data, or turning rate data associated with the vehicle), and output intersection probabilities 106 indicating whether the vehicle 108 is likely to intersect with a rear region of the vehicle 102. The data input into the model component 104 may include, in some examples, top-down multi-channel "image" data indicative of a top-down representation of an environment. The model may also or instead determine an intersection probability based at least in part on an occupancy grid comprising a plurality of grid points representing pixels in the environment. As a non-limiting example, the model may output one or more occupancy grids corresponding to one or more times in the future. If a grid portion overlaps with a known or expected position of the vehicle at that future time, a collision may be determined. In various examples, the model can process the velocities of the object and the vehicle to determine a response to the simulation by a vehicle safety system. In various examples, the occupancy grid(s) and velocity estimates determined by the model may be from different heads of a same neural network.

The intersection probabilities 106 from the model component 104 can be used by a vehicle computing device in a variety of ways. For instance, the model component 104 can determine, based at least in part on the intersection probabilities 106, whether to generate a signal indicative of a potential intersection with a planning component (e.g., planning component 524) of the vehicle computing device to control the vehicle 102 in the environment 100 (e.g., determine a vehicle trajectory 116 and/or control a propulsion system, a braking system, or a steering system). The intersection probabilities 106 may also or instead be used to perform a simulation by setting up conditions (e.g., an intersection, a number of objects, a likelihood for the object to exhibit abnormal behavior, etc.) for use during the simulation (e.g., by a vehicle computing device or computing device remote from the vehicle) in order to predict motion associated with object(s) in the environment. Additional examples of a vehicle architecture determining intersection probabilities can be found, for example, in U.S. patent application Ser. No. 16/591,518 titled "Collision Avoidance Perception System" filed Oct. 2, 2019, the entirety of which are herein incorporated by reference in its entirety.

A training component of a remote computing device, such as the computing device(s) 550 (not shown) and/or the vehicle computing device (not shown) may be implemented to train the model component 104. Training data may include a wide variety of data, such as image data, video data, lidar data, radar data, audio data, other sensor data, etc., that is associated with a value (e.g., a desired classification, inference, prediction, etc.). Such values may generally be referred to as a "ground truth." To illustrate, the training data may be used for image classification and, as such, may include an image of an environment that is captured by an autonomous vehicle and that is associated with one or more classifications. In some examples, such a classification may be based on user input (e.g., user input indicating that the image depicts a specific type of object) or may be based on the output of another machine learned model. In some examples, such labeled classifications (or more generally, the labeled output associated with training data) may be referred to as ground truth.

Figure 2:
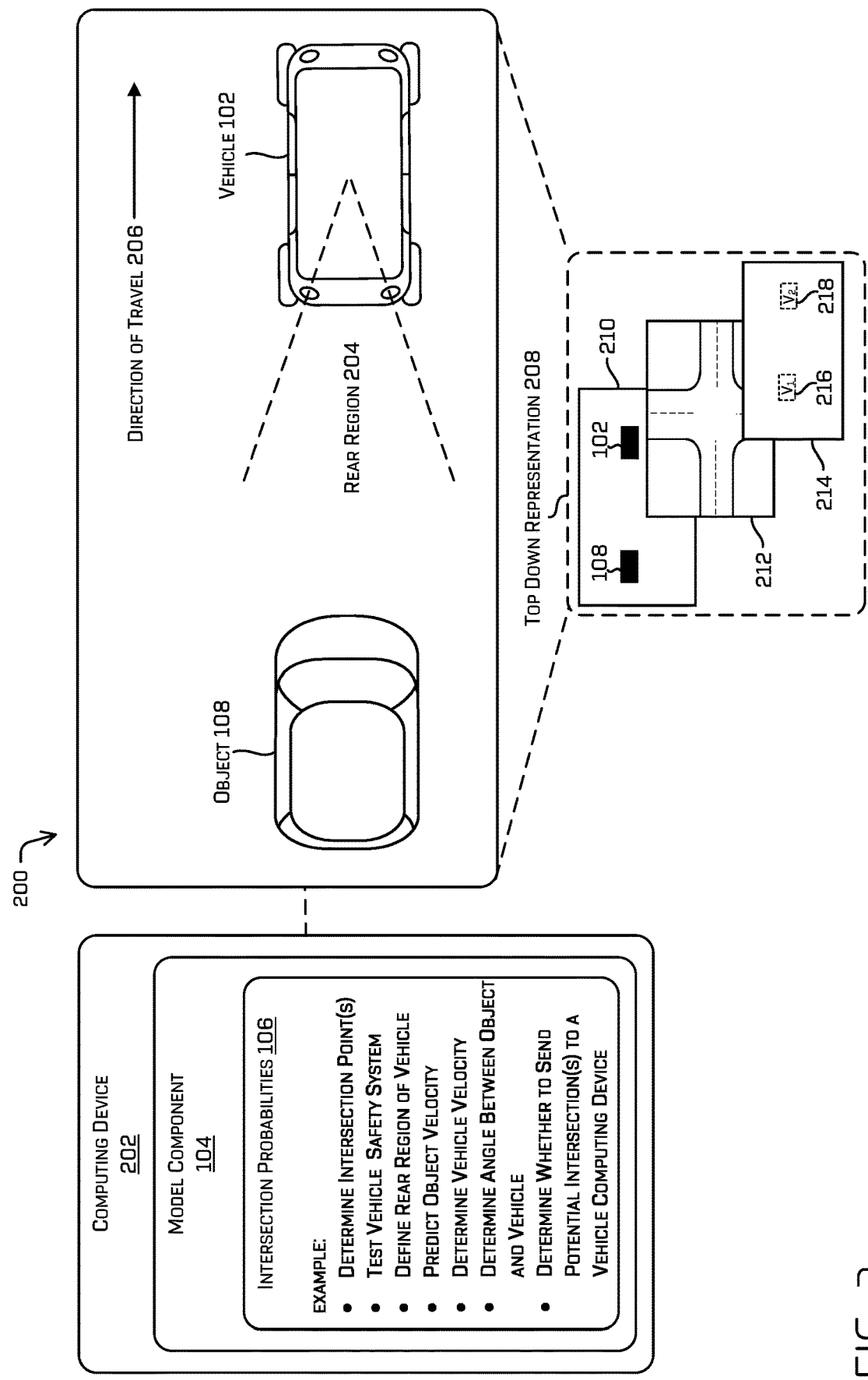
FIG. 2 is an illustration of another example environment, in which one or more models determine an intersection point between a region of a vehicle and an object.

FIG. 2 is an illustration of another example environment 200, in which one or more models determine an intersection point between a region of a vehicle and an object. For instance, a computing device 202 can implement the model component 104 to output intersection probabilities 106 between one or more objects (e.g., object 108) and a rear region 204 of the vehicle 102. In some examples, the computing device 202 may be associated with a vehicle safety system and may include the vehicle computing device(s) 504 and/or the computing device(s) 550.

In some examples, the vehicle 102 is a bi-directional vehicle, and as such, the model component 104 can define, identify, or otherwise determine the rear region 204 relative to a direction of travel 206 as the vehicle 102 navigates in the environment 200. For instance, the rear region 204 of the vehicle 102 can change depending upon the direction of travel 206.

The model component 104 can receive two-dimensional representations of the example environment 200 as input. For example, as part of "pre-processing" the sensor data for use as input data, a model of a vehicle safety system may associate sensor data (or portions thereof) with two-dimensional representations to achieve a desired input data size for more efficient processing. The two-dimensional data representation (also referred to as a two-dimensional representation or a 2D space) may include a vector representation (not shown) and/or a top-down representation 208 of the environment 200. In such examples, data may be encoded into a multi-channel two-dimensional representation in which each channel comprises different data of the environment creating what may be referred to herein as top-down image data. In various examples, a machine learned model can determine the input data based at least in part on down sampling and/or up sampling portions of the sensor data to achieve a desired resolution or data size for the input data. For example, lidar data, radar data, or other types of data included as part of the sensor data may be modified for use as input data (e.g., reduced in size and/or resolution) into a model that determines the intersection probabilities 106 between the object(s) and the vehicle 102.

In some examples, the input data can comprise image data, lidar data, radar data, data point information (e.g., a distance from the vehicle, an azimuth angle relative to the vehicle, intensity, coordinate values, velocity, and so on), vehicle information (e.g., a planned trajectory of the vehicle, position, orientation, steering wheel angle, and so on), object information (e.g., a predicted velocity, trajectory, position, orientation, and so on), environmental information (e.g., weather conditions, elevation, and the like), and/or parameter information (e.g., one or more parameters associated with an algorithm to be implemented by the model).

Generally, the top-down representation 208 input into the model component 104 can represent an area around the vehicle 102. In some examples, the area can be based at least in part on an area visible to sensors (e.g., a sensor range), a receding horizon, an area associated with an action (e.g., traversing through an intersection), and the like. In some examples, the top-down representation may represent a 100 meter×100 meter area around the vehicle 102, although any area is contemplated. In various examples, the top-down representation 208 may be determined based at least in part on map data and/or sensor data captured from or associated with a sensor of the autonomous vehicle 102 in the environment 200.

In various examples, the top-down representation 208 of the environment 200 may be representative of a top-down perspective of the environment and may comprise one or more multi-channel image(s) such as a first channel 210, a second channel 212, and a third channel 214. The computing device can generate or determine the multi-channel image(s) to represent different attributes of the environment 200 with different channel images. For instance, an image having multiple channels, wherein each channel is representative of some information (semantic or otherwise). In some examples, one of the channel images 210, 212, and 214 can represent an object position, a feature of the environment, an object velocity 216, an object heading, an object acceleration, an object yaw, an attribute of the object, a vehicle velocity 218, crosswalk permission (e.g., a crosswalk light or audio state), and traffic light permissibility (e.g., a traffic light state), just to name a few. In this way, the top-down representation 208 can represent objects in the environment 200 (e.g., represented by a bounding box, as discussed herein), semantic information about the object (e.g., a classification type), movement information (e.g., velocity information, acceleration information, etc.), and the like. Additional details of using to-down representations are described in U.S. patent application Ser. No. 16/504,147, filed on Jul. 5, 2019, entitled "Prediction on Top-Down Scenes Based On Action Data," and in U.S. patent application Ser. No. 16/151,607, filed on Oct. 4, 2018, entitled "Trajectory Prediction on Top-Down Scenes," which are incorporated herein by reference in their entirety and for all purposes.

The model can determine a potential intersection with the rear region 204 in a variety of ways. By way of example and not limitation, the model component 104 can predict or otherwise determine a trajectory, a velocity, an acceleration, yaw, and the like of the object 108 based at least in part on sensor data from one or more sensors associated with the vehicle 102. Additionally, the model component 104 can determine an acceleration, a velocity, yaw, and the like of the vehicle 102 based on receiving vehicle state data (e.g., data describing a current position, orientation, velocity, acceleration, trajectory, and so on of the vehicle) from a vehicle computing device. In such examples, the model component 104 can determine an angle and/or magnitude of the object 108 relative to the vehicle 102 based at least in part on the object velocity (e.g., a first velocity vector indicating a direction and a magnitude) and the vehicle velocity (e.g., a second velocity vector indicating a second direction and magnitude). In other examples, object information other than or in addition to the object velocity (e.g., object yaw, object acceleration, and the like) may be used to determine if an intersection with the rear region 204 occurs or is likely to occur in the future.

In various examples, the model component 104 can output, based at least in part on the top-down multi-channel data associated with the top-down representation 208, an occupancy grid comprising a plurality of grid points representing pixels in the environment 200. In such examples, the model component 104 can determine the velocity of the object 108 based at least in part on a velocity associated with a grid point of the occupancy grid. In some examples, the velocity of one or more objects and/or the velocity of the vehicle 102 can be represented in Cartesian coordinates. The model component 104 may, for example, use the top-down representation 208 to identify pixels of a channel (e.g., the channel 214) to represent the respective velocities (e.g., the velocity 216 of the object 108 and the velocity 218 of the vehicle 102). The model component 104 may also or instead determine an intersection probability between the object 108 and the vehicle 102 based on determining whether the object will occupy a pixel or otherwise be associated with a grid point of the grid.

As mentioned, in some examples, the model component 104 can determine if the object 108 intersects with the rear region 204 of the vehicle 102 based at least in part on the angle between respective velocities of the object and vehicle. In one specific example, the angle may be determined by:

$$\cos(\theta) = \hat{V}\text{ vehicle} \cdot \hat{V}\text{object} < \cos\left(\arctan\left(\frac{\text{width}}{\text{length}}\right)\right) \quad (1)$$

in which the width and length correspond to the vehicle 102.

The model component 104 can determine, based at least in part on the angle and/or the magnitude associated with the velocities of the object and vehicle, whether to report (e.g., generate a signal associated with) a potential intersection between the object 108 and the rear region 204 to a vehicle computing device that is configured to control the vehicle 102 (e.g., determine an action related to steering, acceleration, and/or braking to avoid an object). Additionally or alternatively, the model component 104 can determine whether to report a potential intersection between the object 108 and the rear region 204 to a vehicle computing device based at least in part on determining a report time to initiate an a braking action, a steering action, and/or an acceleration action by the vehicle relative to the intersection point 114. Additional details for determining a time to report the potential intersection are discussed throughout this disclosure including in FIG. 3.

In various examples, the model component 104 can determine, based at least in part on the angle, an intersection probability between the object 108 and the rear portion 204 of the vehicle 102 at the intersection point 114 at a future time. In various examples, the model component 104 can determine to report a potential intersection between the object 108 and a region of the vehicle 102 (e.g., the rear region 204) to the vehicle computing device based at least in part on the vehicle velocity being greater than the object velocity. In other examples, the model component 104 may determine to omit sending an indication of a potential intersection to the vehicle computing device based at least in part on one or more of the intersection probabilities 106 between the object 108 and the vehicle 102 and/or the determined report time.

Figure 3:
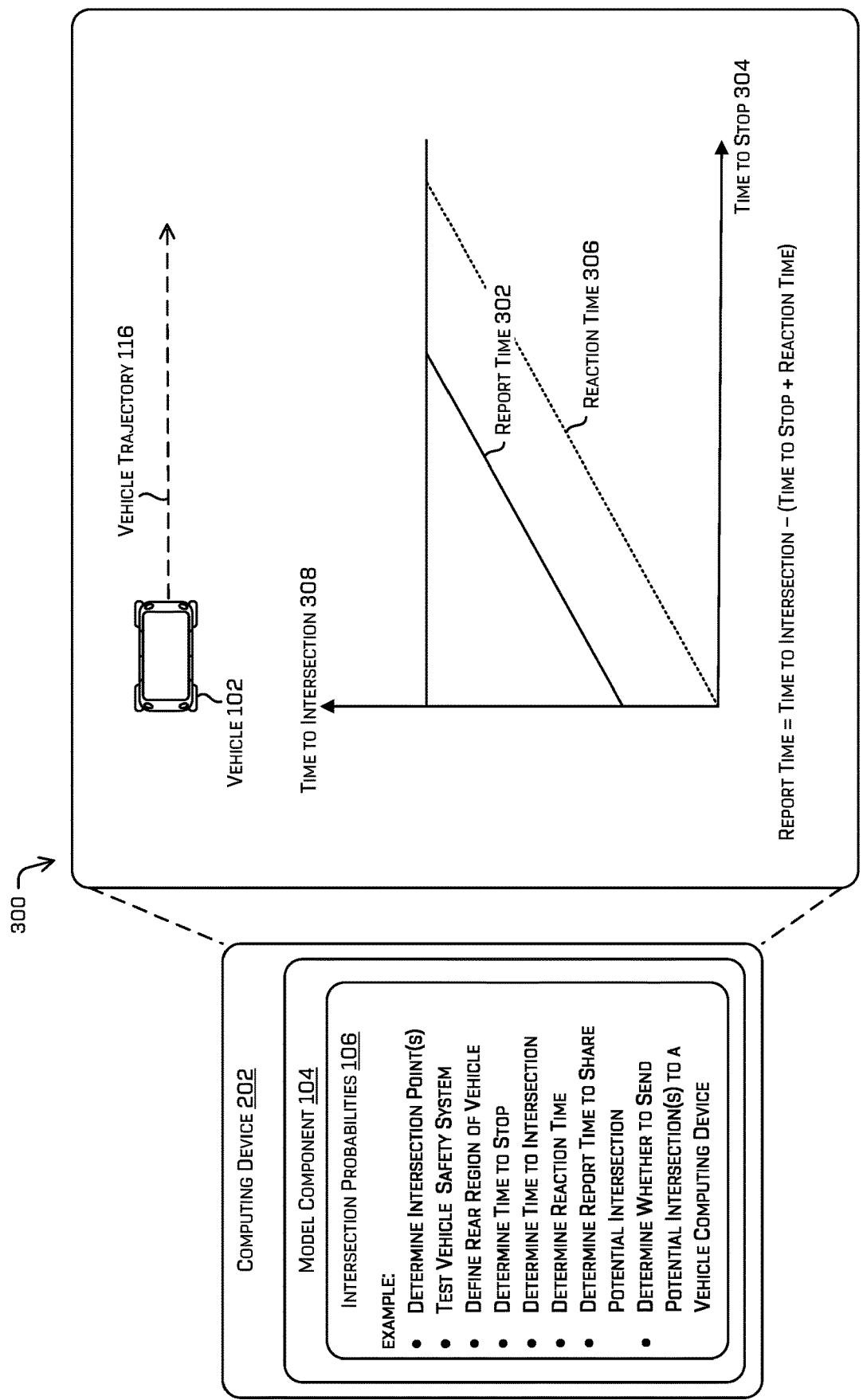
FIG. 3 is an illustration of an example model to determine when to generate a signal indicative of a potential intersection in an environment.

FIG. 3 is an illustration of an example model to determine when to generate a signal indicative of a potential intersection in an environment 300. For instance, a vehicle safety system can implement the model component 104 that receives data associated with the top-down representation 208 and determines an output indicating intersection probabilities 106 between object(s) and the vehicle 102 in the environment 300. In some instances, the intersection probabilities 106 can indicate that an object is likely to intersect with a rear region of the vehicle 102, and a determination can be made whether or not, and when, to report the potential intersection. In this way, the model component 104 can act as a reaction time filter that delays reporting the potential intersection for a period of time.

In some examples, the model component 104 can determine a distance between the object and the intersection point 114. For example, based on sensor data associated with the vehicle 102, the model component 104 can determine a trajectory (e.g., direction, speed, acceleration, etc.) of the object based on the sensor data and calculate, using dynamics of the object, a distance between the object and the vehicle 102 for a given time. In some example, the model component 104 can determine to refrain from generation a signal indicating that a potential intersection will occur based at least in part on the distance of the object to the intersection point 114. In this way, the model component 104 can determine whether to send a signal indicating a potential intersection by employing "a distance filter". For instance, the model component 104 may determine that the distance is sufficiently large to delay generating the signal for a period of time. As the vehicle navigates in the environment, the object may become closer to the vehicle such that the model component 104 determines that the signal should be sent to the vehicle computing device. However, in other examples, the distance may increase from a first time to a second time, and in such examples, the model component 104 can refrain from sending the signal resulting in fewer signals sent to the vehicle computing device (and subsequently fewer actions by the vehicle).

In some examples, the model component 104 can determine a time for the vehicle to stop to avoid an object, an intersection time with the object, and/or a reaction time by the vehicle 102, and calculate a time to report a potential intersection to a vehicle computing device. For instance, a report time 302 can be determined by the model component 104 based at least in part on a time to stop 304 for the vehicle 102, a reaction time 306, and a time to the potential intersection 308. In some examples, an object may change a direction of travel, a speed, and so on, over time which can affect whether the object arrives at the predicted intersection point in the future. By continuing to capture information about how the object changes with time, reporting of the potential intersection can be delayed until the vehicle has just enough time to brake or accelerate to avoid the potential collision thereby reducing a number of reported potential collisions to a vehicle computing device. By reducing a number of reported potential collisions, computational resources available to the vehicle safety system and/or vehicle computing device are increased to enable processing of additional potential intersections, thereby improving safety of the vehicle 102 (relative to not implementing the model component 104).

Determining the report time 302 by the model component 104 can include determining the time for the vehicle to stop 304 (e.g., a time for the vehicle to take an action to avoid the potential intersection at the intersection point) and the reaction time 304 of the vehicle (e.g., a time for the vehicle to implement an action). In some examples, the report time 302 can be determined by subtracting a combination of the time to stop 304 and the reaction time 306 from the time to intersection 308 (e.g., time for the object to reach the intersection point). In various examples, as the vehicle navigates in the environment, sensor data can capture changes in the object state (e.g., changes in object state data) which further changes the time to stop 304, the reaction time 306, and/or the time to intersection 308. Thus, the model component 104 can, in some examples, refrain from generating a signal indicative of a potential intersection for sending to the vehicle computing device in accordance with the report time 302.

In various examples, the model component 104 can determine to report a potential intersection between the object 108 and a region of the vehicle 102 (e.g., the rear region 204) to the vehicle computing device based at least in part on the determined report time. For example, the model component 104 can compare, as a comparison, at least one of: the time for the vehicle to stop (e.g., a first time such as the time to stop 304) to avoid an object, the reaction time 306 (e.g., a second time), and/or the intersection time 308 (e.g., a third time) to a time threshold, and determine the time to initiate an action by the vehicle 102, or report the potential intersection, based at least in part on the comparison. For example, one or more of the report time 302, the time to stop 304, the reaction time 306, or the time to intersection 308 may be considered valid when meeting or exceeding a respective time threshold value, or alternatively be considered invalid when below the time threshold.

In various examples, the model component 104 can determine the intersection probabilities 106 and generate a signal indicating a potential intersection between the object and a region of the vehicle based at least in part on the rear-collision filter, the report time filter, and/or the distance filter.

Figure 4:
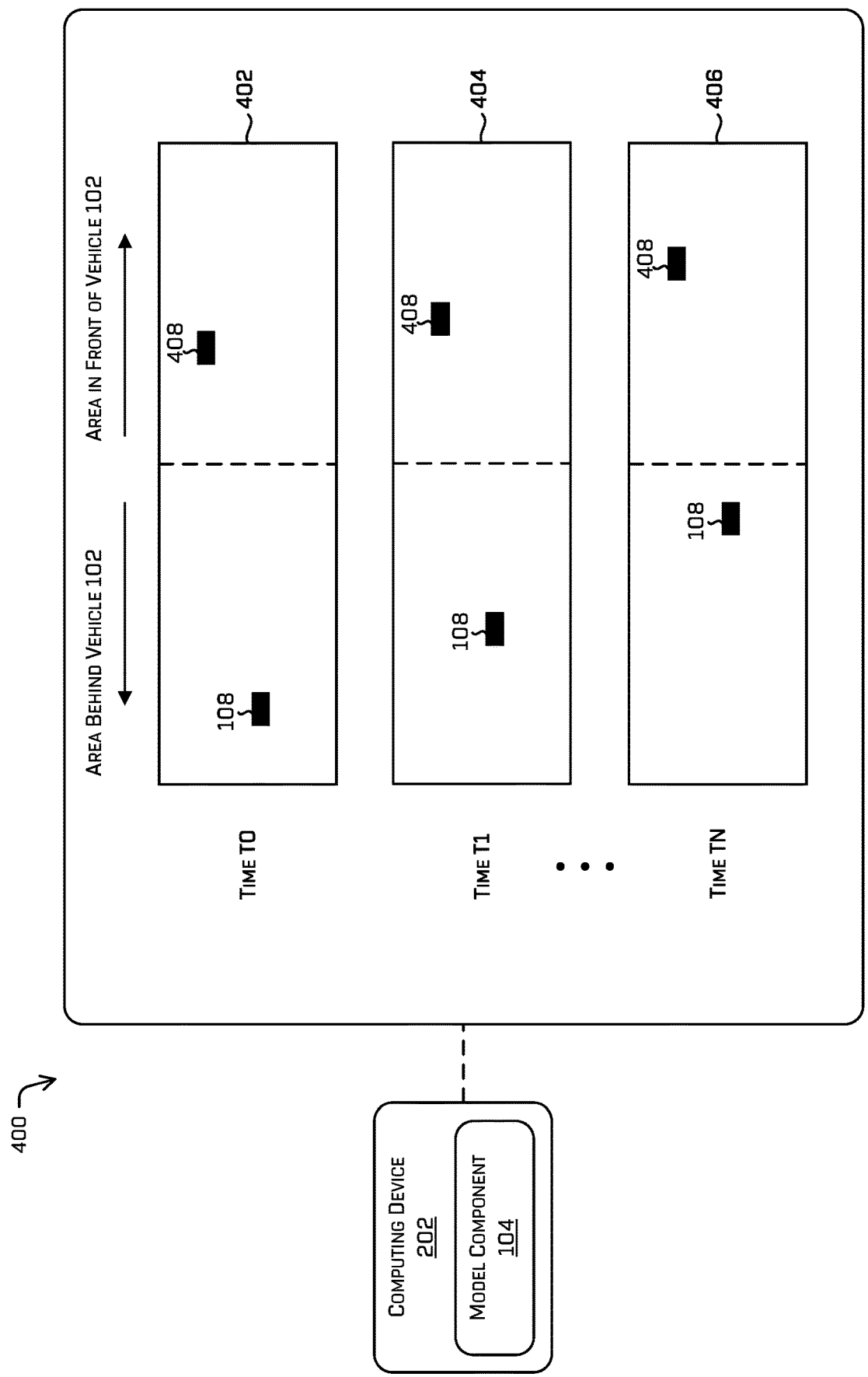
FIG. 4 is an illustration of an example implementation, in which one or more models determine potential intersections between object(s) and a vehicle in an environment.

FIG. 4 is an illustration of an example implementation, in which one or more models determine potential intersections between object(s) and a vehicle in an environment. For instance, a computing device (e.g., a vehicle safety system) can implement the model component 104, or a different model, to initiate an example scenario 400 comprising one more objects and the vehicle. In some examples, the scenario 400 can include predictions about future positions and/or velocities of object(s) in an environment proximate to the vehicle.

As illustrated in FIG. 4, the output of the model component 104 can include predicting scenarios 402, 404, and 406 at times T0, T1, . . . TN (where N is an integer greater than 1) indicative of future states of the environment. For example, sensor data associated with the vehicle 102 can be used to perform the scenarios 402, 404, and 406 to identify potential objects that may intersect with the vehicle 102 at different times in the future. In one specific example, the scenarios may be performed for 2 seconds in the future to identify object(s) in an area around the vehicle 102 including the vehicle 108 behind the vehicle 102 and an object 408 (e.g., a vehicle, a bicycle, a pedestrian, and so on) in front of the vehicle 102. As shown in FIG. 4, as time changes from time T0 to time T1, the object 108 is approaching the vehicle 102 indicating that the object 108 has a greater speed than a speed of the vehicle 102 while the object 408 is increasing a distance from the vehicle 102 over time.

In various examples, the model component 104 can determine a response to the scenario 402 at time T0, the scenario 404 at time T1, and/or the scenario 406 at time TN by a secondary system (e.g., the vehicle safety system). In such examples, the model component 104 can determine to omit an indication of a potential intersection with the object 108 or the object 408 to a vehicle computing device based at least in part on the response. For example, based on at least one of the scenarios 402, 404, or 406 indicating that the scenario results in an object intersecting with a rear region of the vehicle 102, the model component 104 can omit sending information about the potential collision to the vehicle computing device.

In some examples, a potential intersection with a rear of the vehicle can be communicated to another model or component of a vehicle computing device for validating commands determined by the vehicle computing device. In some examples, and as discussed in FIG. 5 and elsewhere, a vehicle computing device can use the intersection data to improve detections of objects proximate a vehicle. In one example, the vehicle computing device can cause the vehicle 102 to accelerate to avoid an object approaching a rear region of the vehicle.

Figure 5:
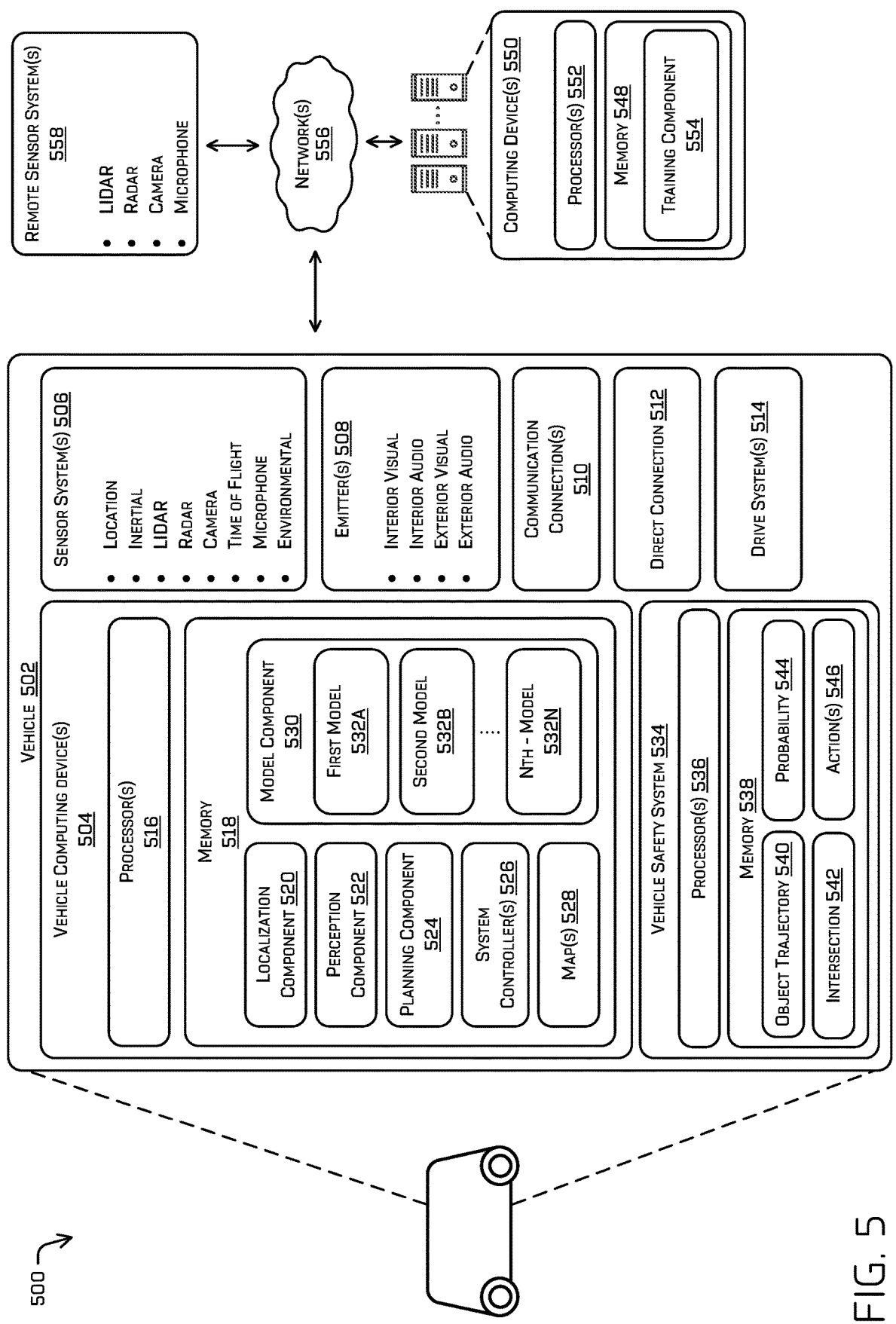
FIG. 5 is a block diagram of an example system for implementing the techniques described herein.

FIG. 5 is a block diagram of an example system 500 for implementing the techniques described herein. In at least one example, the system 500 may include a vehicle, such as vehicle 502.

The vehicle 502 may include a vehicle computing device 504 (also referred to as a vehicle computing device 504 or vehicle computing device(s) 504), one or more sensor systems 506, one or more emitters 508, one or more communication connections 510, at least one direct connection 512, and one or more drive systems 514.

The vehicle computing device(s) 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In the illustrated example, the memory 518 of the vehicle computing device 504 stores a localization component 520, a perception component 522, a planning component 524, one or more system controllers 526, one or more maps 528, and a model component 530 including one or more models, such as a first model 532A, a second model 532B, up to an Nth model 532N (collectively "models 532"), where N can be any integer greater than 1. Though depicted in FIG. 5 as residing in the memory 518 for illustrative purposes, it is contemplated that the localization component 520, the perception component 522, the planning component 524, the one or more system controllers 526, the one or more maps 528, and/or the model component 530 including the models 532 may additionally, or alternatively, be accessible to the vehicle 502 (e.g., stored on, or otherwise accessible by, memory remote from the vehicle 502, such as, for example, on memory 548 of a remote computing device 550).

Additionally, vehicle 502 may include a vehicle safety system 534, including an object trajectory component 540, an intersection component 542, a probability component 544, and an action component 546. As shown in this example, the vehicle safety system 534 may be implemented separately from the vehicle computing device(s) 504, for example, for improved performance of the vehicle safety system, and/or to provide redundancy, error checking, and/or validation of determinations and/or commands determined by the vehicle computing device(s) 504. However, in other examples, the vehicle safety system 534 may be implemented as one or more components within the same vehicle computing device(s) 504.

By way of example, the vehicle computing device(s) 504 may be considered to be a primary system, while the vehicle safety system 534 may be considered to be a secondary system. The primary system may generally perform processing to control how the vehicle maneuvers within an environment. The primary system may implement various artificial intelligence (AI) techniques, such as machine learning, to understand an environment around the vehicle 502 and/or instruct the vehicle 502 to move within the environment. For example, the primary system may implement the AI techniques to localize the vehicle, detect objects around the vehicle, segment sensor data, determine classifications of the objects, predict object tracks, generate trajectories for the vehicle 502 and the objects around the vehicle, and so on. In some examples, the primary system may process data from multiple types of sensors on the vehicle, such as light detection and ranging (lidar) sensors, radar sensors, image sensors, depth sensors (time of flight, structured light, etc.), cameras, and the like, within the sensor systems 506.

In some examples, the vehicle safety system 534 may operate as separate system that receives state data (e.g., perception data) based on the sensor data and AI techniques implemented by the primary system (e.g., vehicle computing device(s) 504), and may perform various techniques described herein for improving collision prediction and avoidance by the vehicle 502. As described herein, the vehicle safety system 534 may implement techniques for predicting intersections/collisions based on sensor data, as well as probabilistic techniques that are based on positioning, velocity, acceleration, etc. of the vehicle and/or objects around the vehicle. In some examples, the vehicle safety system 534 may process data from sensors, such as a subset of sensor data that is processed by the primary system. To illustrate, the primary system may process lidar data, radar data, image data, depth data, etc., while the vehicle safety system 534 may process just lidar data and/or radar data (and/or time of flight data). In other examples, however, the vehicle safety system 534 may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference in its entirety and for all purposes.

Although depicted in FIG. 5 as residing in the memory 518 for illustrative purposes, it is contemplated that the localization component 520, the perception component 522, the planning component 524, the model component 530, the system controllers 526, and the maps 528 may additionally, or alternatively, be accessible to the vehicle 502 (e.g., stored on, or otherwise accessible by, memory remote from the vehicle 502, such as, for example, on memory 548 of a remote computing device 550). Similarly, the although the object trajectory component 540, intersection component 542, probability component 544, and/or action component 546 are depicted as residing in the memory 538 of the vehicle safety system 534, one or more of these components may additionally, or alternatively, be implemented within vehicle computing device(s) 504 or may be accessible to the vehicle 502 (e.g., stored on, or otherwise accessible by, memory remote from the vehicle 502, such as, for example, on memory 548 of a remote computing device 550).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528 and/or map component 528, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 may include a prediction component to generate predicted trajectories of objects (e.g., dynamic objects such as pedestrians, cars, trucks, bicyclists, animals, etc.) in an environment. For example, a prediction component may generate one or more predicted trajectories for objects within a threshold distance from the vehicle 502. In some examples, a prediction component may measure a trace of an object and generate a trajectory for the object based on observed and predicted behavior.

In at least one example, the vehicle computing device 504 may include one or more system controllers 526, which may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, detect or determine gravity, detect objects in an environment, generate routes, determine actions and/or trajectories to navigate within an environment.

In some examples, the one or more maps 528 may be stored on a remote computing device(s) (such as the computing device(s) 550) accessible via network(s) 556. In some examples, multiple maps 528 may be stored based on, for example, a characteristic (e.g., type of entity, time of day, day of week, season of the year, etc.). Storing multiple maps 528 may have similar memory requirements, but increase the speed at which data in a map may be accessed.

As illustrated in FIG. 5, the vehicle computing device 504 may include a model component 530. The model component 530 may be configured to determine intersection probabilities between an object in an environment of the vehicle 502. In various examples, the model component 530 may receive sensor data associated with an object from the localization component 520, the perception component 522, and/or from the sensor system(s) 506. In some examples, the model component 530 may receive map data from the localization component 520, the perception component 522, the maps 528, and/or the sensor system(s) 506. While shown separately in FIG. 5, the model component 530 could be part of the localization component 520, the perception component 522, the planning component 524, or other component(s) of the vehicle 502.

In various examples, the model component 530 may send output(s) from the first model 532A, the second model 532B, and/or the Nth model 532N may be used by the perception component 522 to alter or modify an amount of perception performed in an area of the object based on an associated intersection value. In some examples, the planning component 524 may determine one or more actions (e.g., reference actions and/or sub-actions) for the vehicle 502 based at least in part on output(s) from the model component 530. In some examples, the model component 530 may be configured to output information indicating a probability that an object is likely to cause a collision. In some examples, the model component 530 may include at least the functionality provided by the model component 104 of FIG. 1.

In some examples, the model component 530 may communicate an output to the perception component 522 to cause an update to one or more parameters (e.g., bias values, drift values, and the like) associated with the sensor system(s) 506.

In various examples, the model component 530 may utilize machine learning techniques to determine an intersection probability, as described with respect to FIG. 1 and elsewhere. In such examples, machine learning algorithms may be trained to predict a probability of an intersection while improving accuracy of the prediction.

The vehicle safety system 534 may include an object trajectory component 540 configured to determine a trajectory for the vehicle 502 and/or trajectories for other objects identifying within an environment, using the various systems and techniques described herein. In some examples, the object trajectory component 540 may receive planning data, perception data, and/or map data from the components 520-526 to determine a planned trajectory for the vehicle 502 and trajectories for the other objects in the environment.

In various examples, the object trajectory component 540 may generate a set of single points and/or pairs of related points (e.g., for a path polygon) representing a trajectory. In some examples the pairs of points and/or single points for a single trajectory may be at consistent intervals (e.g., 0.2 second intervals, 0.5 second intervals, etc.) from one another. In some examples, the pairs of points and/or single points may be at varying intervals from one another. In various examples, the pairs of points and/or single points may be represented at equal distances in length (e.g., length along the path) from one another. In such examples, each left/right point of a point pair may be at a pre-defined distance (e.g., 1 meter, 3 feet, 18 inches, etc.) from the next left/right point of the point pair. In some examples, the pairs of points may be at different distances in length from one another. In various examples, the distances may be determined based on a vehicle/object maneuvers, speeds, density of traffic in the environment, and/or other factors impacting the vehicle 502 or object for which the trajectory is determined.

In some examples, the object trajectory component 540 determine a single planned trajectory for the vehicle 502 (e.g., based on planning data and map data received from the planning component 524 and maps 528, and may determine multiple trajectories for one or more other moving objects (e.g., vehicle 110) in the environment in which the vehicle 502 is operating. In some examples, the trajectories of another object may include any number of possible paths in which the object may travel from a current position (e.g., at the time of perception) and/or based on a direction of travel. Based on the determination that the agent is within the threshold distance or time to the vehicle 502, the object trajectory component 540 may determine the trajectories associated with the object. In some examples, the object trajectory component 540 may be configured to determine the possible trajectories of each detected moving object in the environment.

In various examples, the intersection component 542 may use the various techniques described herein to determine intersections between the trajectory of the vehicle 502 and/or one or more of the trajectories for other objects in the environment, to determine whether a potential collision zone may exist in the environment. A potential collision zone may include an area in which, based on the object state data, vehicle state data, and/or the trajectories, an intersection may occur between the vehicle 502 and an object (e.g., vehicle 110). In at least some examples, a trajectory for the object and object attributes (e.g., object size, position, orientation, pose, etc.) may be used to calculate an intersection point between the object and the vehicle. In such examples, a collision zone may be defined by the overlapping area between the a portion of the vehicle 502 (e.g., a rear portion) and at least a portion of the object.

In some examples, the potential collision zone may exist between the vehicle 502 and the object if the trajectory associated with the vehicle 502 intersects with at least one trajectory associated with the object. In various examples, the intersection component 542 may determine that the potential collision zone may exist between the vehicle 502 and the object based on the vehicle and object trajectories being within a threshold distance (e.g., 2 feet, 3 feet, 4 meters, 5 meters, etc.). In some examples, the threshold distance may be based on a pre-defined distance. In various examples, the threshold distance may be determined based on a known or perceived width of the vehicle and/or of the object. In some examples, the threshold distance may be determined further a buffer, which may represent a safety buffer around the vehicle 502 and/or the object.

In some examples, the intersection component 542 may expand the edges of the vehicle trajectory and/or trajectories for the object, from the center of the vehicle 502 and object respectively, based on the known or perceived width of the vehicle and object. If the expanded width of the vehicle trajectory (or path polygon) and object trajectory (or path polygon) intersects and/or pass within a minimum allowable distance (e.g., 3 inches, 5 inches, 1 feet), the intersection component 542 may determine that the potential collision zone exists. If the expanded width of the vehicle trajectories and/or path polygons do not intersect and/or pass by more than the minimum allowable distance, the intersection component 542 may determine that the collision zone does not exist. The minimum allowable distance may be based on whether passengers are in the vehicle, a width of the roads in the environment, passenger comfort and/or reaction, learned tolerances of passengers, local driving etiquette, or the like.

In various examples, based on a determination that a potential collision zone may exist, the intersection component 542 may be configured to determine the bounds of the potential collision zone. In some examples, the potential collision zone may include four elements, a vehicle enter point, a vehicle exit point, an object enter point, and an object exit point. Each of the vehicle 502 and object enter and exit points may include a position and distance. The object entry point and object exit point may include trajectory samples, such as trajectory samples, along the trajectory of the object. In some examples, object entry point and agent exit point may represent trajectory samples in which a risk of collision does not exist. In various examples, an object enter point position may be determined by identifying the last trajectory sample associated with the trajectory of the object prior to an intersection (e.g., convergence) with the trajectory or path polygon for the vehicle 502. In some examples, an object exit point position may be determined by identifying the first trajectory sample associated with the object trajectory after the convergence between the trajectory of the object and the trajectory or path polygon of the vehicle 502. The distance associated with object enter point and the object exit point may be derived from the respective positions as a distance along the trajectory.

As discussed above, in various examples the intersection component 542 may perform time-space overlap analysis on one or more potential collision zones (bounds thereof, such as the vehicle and object enter and exit points). In various examples, the time-space overlap may be represented as position cones associated with predicted object trajectories and the planned trajectory of the vehicle 502. In various examples, the intersection component 542 may be configured to determine a vehicle position cone and an agent position cone. The vehicle position cone may be determined based on probable velocities of the vehicle 502 along the planned trajectory (e.g., path polygon) through the potential collision zone. The object position cone may be determined based on probable velocities of the agent along the trajectory for the object associated with the potential collision zone.

In various examples, the probable velocities of the object may be derived from probable accelerations (e.g., positive and negative accelerations) of the intersection component 542. The accelerations may include positive accelerations based on a fast-behavioral model (e.g., aggressive behavior) and negative accelerations based on a slow-behavioral model (e.g., conservative behavior). In various examples, the positive accelerations associated with the object may be based on traffic laws, rules of the road, local driving etiquette, traffic patterns, semantic classification of the agent, or the like. In some examples, the positive accelerations may represent a maximum amount of positive acceleration probable in the environment based on an initial velocity. In various examples, the negative accelerations associated with the object may represent a maximum amount of negative acceleration probable in the environment, such as that based on the initial velocity of the object.

In various examples, intersection component 542 may determine position lines and/or position cones for the object and the vehicle 502 respective to the potential collision zone. The position lines and/or cones for the vehicle 502 and the object may be based on the object entry time, object exit time, vehicle entry time, and vehicle exit time with respect to the potential collision zone. In such examples, the entry times into the potential collision zone may be associated with a most aggressive estimation of speed. In various examples, the object exit time and the vehicle exit time may be associated with respective minimum velocities. In such examples, the exit times into the potential collision zone may be associated with a most conservative estimation of speed.

In some examples, the time-space overlap may be represented as one or more probability density functions associated with probable positions of the object based on time. The probable positions of the object may be derived from probable accelerations, and speeds derived therefrom and/or outputs of other systems or subsystems (e.g., a prediction system, which may be, for example, a subsystem of the perception component 522). The probability density functions may represent aggressive and conservative driving speeds, as well as uncertainties based on accelerations of the object, such as those based on traffic laws, rules of the road, local driving etiquette, traffic patterns, semantic classification of the agent, or the like. The probability density functions may represent two-dimensional area or three-dimensional areas associated with the object. The total sum of the area under a curve of a probability density function may equal 1.

In various examples, probability component 544 may determine a prediction of an intersection between the vehicle 502 and/or the other object (e.g., vehicle 110) and/or a probability/risk of collision, based on the time-space overlap analyses performed by the intersection component 542. In some examples, the probability component 544 may determine a probability of an intersection based on a single trajectory of the vehicle 502 and a single trajectory of the object, based on an overlap between position lines and/or position cones of the vehicle 502 and object with respect to the potential collision zone. For instance, based on where in the potential collision zone that the position lines overlap, and/or the amount of overlap between the position cones (e.g., the time gap, percentage of cone overlap, etc.), the probability component 544 may determine that a risk of collision may be relatively high, medium, or low.

Additionally, using the various techniques described herein, the probability component 544 also may determine a probability of an intersection between the vehicle 502 and an object, based on the planned trajectory of the vehicle 502 and multiple trajectories of the object. For example, the intersection component 542 may analyze multiple trajectories of the object (e.g., based on perturbations of the object state parameters), and the probability component 544 may determine a single collision prediction based on the results of the analyses the multiple trajectories. In some cases, the probability component 544 may determine an intersection probability based on the percentage (or ratio) of trajectories for the object that are determined to intersect or collide with the vehicle 502 based on the planned vehicle trajectory.

In various examples, the action component 546 may determine one or more actions for the vehicle 502 to take, based on predictions and/or probability determinations of an intersection between the vehicle 502 another object (e.g., vehicle 102), along with other factors. The action may include slowing the vehicle to yield to the object, stopping the vehicle to yield to the object, changing lanes or swerving left, or changing or swerving lanes right, etc. Based on the determined action, the vehicle computing device(s) 504, such as through the system controller(s) 526, may cause the vehicle 502 to perform the action. In at least some examples, such an action may be based on the probability of collision, determined by the probability component 544 based on multiple trajectories for the object, as described in detail. In various examples, responsive to determining to adjust a lateral position of the vehicle, such as in a lane change to the left or to the right, the vehicle safety system 534 may cause the components 540-546 to generate an updated vehicle trajectory, plot additional object trajectories with respect to the updated vehicle trajectory, determine updated potential collision zones, and perform time-space overlap analyses to determine whether an intersection risk may still exist after the determined action is performed by the vehicle 502.

The action component 546 may determine, in some examples, one or more actions for the vehicle 502 to take, based on receiving a signal form the model component 530. For instance, the model component 530 can determine an intersection probability between the vehicle 502 and one or more objects and generate a signal for sending to the action component 546 after applying one or more filters such as a rear collision filter, a time to stop filter (e.g., the report time 302), and/or a distance filter (e.g., a distance to the potential intersection). In some examples, the model component 530 sends the signal after determining that the potential intersection is associated with a rear-portion of the vehicle 502 and that the object(s) are at a distance that may impact operation of the vehicle 502 (e.g., cause an intersection, affect passenger comfort, impact vehicle safety, etc.)

As can be understood, the components discussed herein (e.g., the localization component 520, the perception component 522, the planning component 524, the one or more system controllers 526, the one or more maps 528, and the vehicle safety system 534 including the object trajectory component 540, the intersection component 542, the probability component 544, and the action component 546 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 518 (and the memory 548, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 556, to the one or more computing device(s) 550 at a particular frequency, after a lapse of a predetermined period of time, in near real-time, etc. In some examples, the model component 530 may receive sensor data from one or more of the sensor system(s) 506.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., remote computing device 550, other nearby vehicles, etc.) and/or one or more remote sensor system(s) 558 for receiving sensor data. The communication connection(s) 510 also enable the vehicle 502 to communicate with a remote teleoperations computing device or other remote services.

The communication connection(s) 510 may include physical and/or logical interfaces for connecting the vehicle computing device 504 to another computing device or a network, such as network(s) 556. For example, the communication connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the planning component 524, the one or more system controllers 526, the one or more maps 528, and the model component 530, may process sensor data, as described above, and may send their respective outputs, over the one or more network(s) 556, to the computing device(s) 550. In at least one example, the localization component 520, the perception component 522, the planning component 524, the one or more system controllers 526, the one or more maps 528, and the model component 530 may send their respective outputs to the computing device(s) 550 at a particular frequency, after a lapse of a predetermined period of time, in near real-time, etc.

In some examples, the vehicle 502 may send sensor data to the computing device(s) 550 via the network(s) 556. In some examples, the vehicle 502 may receive sensor data from the computing device(s) 550 and/or remote sensor system(s) 558 via the network(s) 556. The sensor data may include raw sensor data and/or processed sensor data and/or representations of sensor data. In some examples, the sensor data (raw or processed) may be sent and/or received as one or more log files.

The computing device(s) 550 may include processor(s) 552 and a memory 548 storing a training component 554.

In some instances, the training component 554 can include functionality to train a machine learning model to output classification values. For example, the training component 554 can receive data that represents labelled collision data (e.g. publicly available data, sensor data, and/or a combination thereof). At least a portion of the data can be used as an input to train the machine learning model. As a non-limiting example, sensor data, audio data, image data, map data, inertia data, vehicle state data, historical data (log data), or a combination thereof may be input into the machine learned model. Thus, by providing data where the vehicle traverses an environment, the training component 554 can be trained to output intersection values associated with objects during simulation, as discussed herein.

In some examples, the training component 554 may be implemented to train the model component 530. Training data may include a wide variety of data, such as image data, video data, lidar data, radar data, audio data, other sensor data, etc., that is associated with a value (e.g., a desired classification, inference, prediction, etc.). Such values may generally be referred to as a "ground truth." In such examples, the training component 554 may determine a difference between the ground truth (e.g., training data) and output(s) by the model component 554. Based at least in part on the difference(s), training by the training component 554 may include altering a parameter of the machine-learned model to minimize the difference(s) to obtain a trained machine-learned model that is configured to determine potential intersection(s) between object(s) in the environment and the vehicle 502.

In various examples, during training, the model component 530 may adjust weights, filters, connections between layers, and/or parameters for training the individual untrained neural networks to predict potential intersection(s) (or other tasks), as discussed herein. In some instances, the model component 530 may use supervised or unsupervised training.

In some examples, the training component 554 can include training data that has been generated by a simulator. For example, simulated training data can represent examples where a vehicle collides with an object in an environment or nearly collides with an object in an environment, to provide additional training examples.

In some examples, functionality provided by the training component 554 may be included and/or performed by the vehicle computing device 504.

The processor(s) 516 of the vehicle 502, processor(s) 536 of the vehicle safety system 534, and/or the processor(s) 552 of the computing device(s) 550 may be any suitable processor capable of executing instructions to process data and perform operations as described herein. By way of example and not limitation, the processor(s) 516, 536, and 552 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518, memory 538, and memory 548 are examples of non-transitory computer-readable media. The memory 518, the memory 538, and/or memory 548 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518, the memory 538, and memory 548 may include at least a working memory and a storage memory. For example, the working memory may be a high-speed memory of limited capacity (e.g., cache memory) that is used for storing data to be operated on by the processor(s) 516, 536, and/or 552. In some instances, the memory 518, the memory 538, and memory 548 may include a storage memory that may be a lower-speed memory of relatively large capacity that is used for long-term storage of data. In some cases, the processor(s) 516, 536, and/or 552 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 may be associated with the computing device(s) 550 and/or components of the computing device(s) 550 may be associated with the vehicle 502. That is, the vehicle 502 may perform one or more of the functions associated with the computing device(s) 550, and vice versa. For instance, either the vehicle 502 and/or the computing device(s) 550 may perform training operations relating to one or more of the models described herein.

Figure 6A:
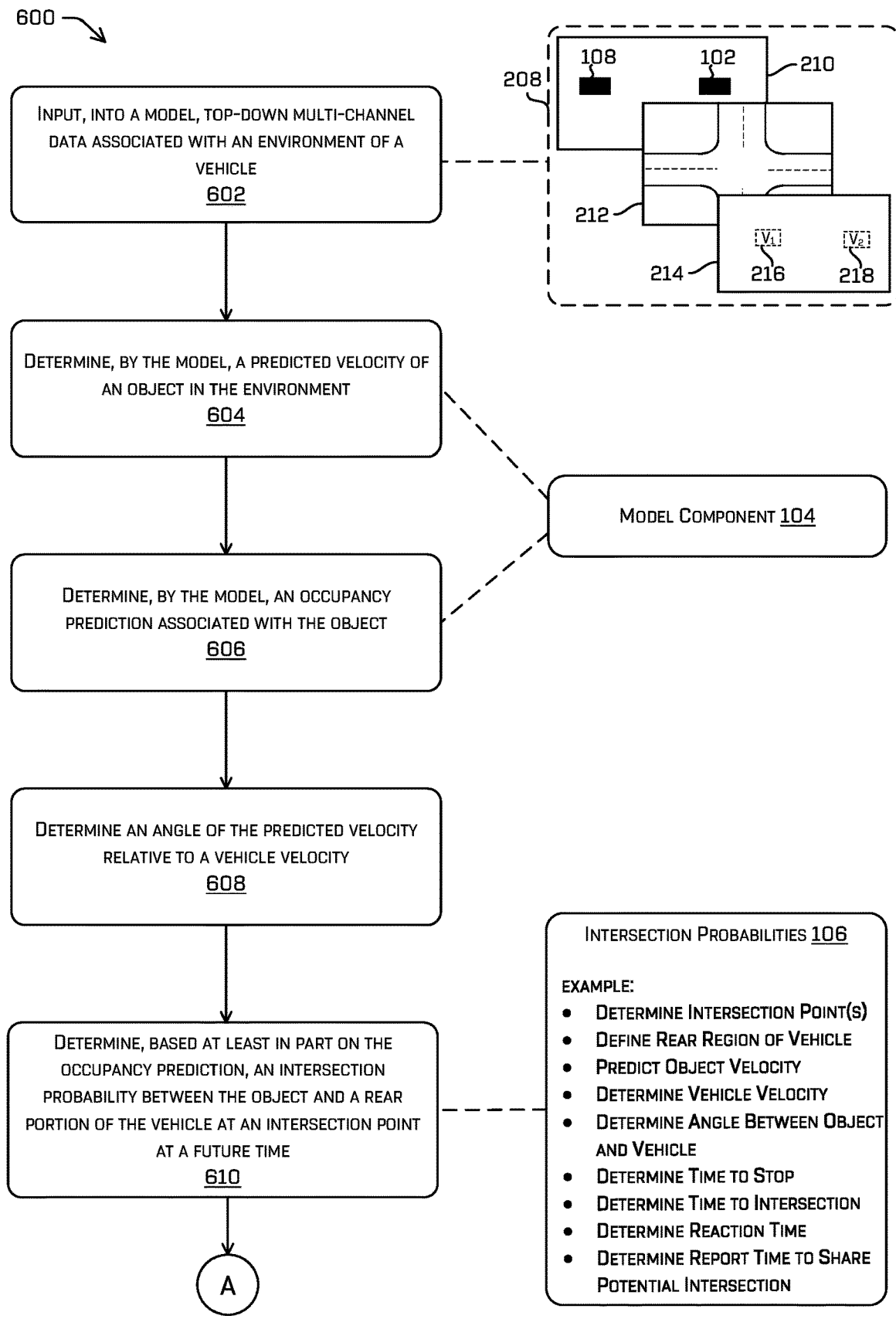
FIG. 6A is a first part of a flowchart depicting an example process for determining a potential intersection using one or more example models.

FIG. 6A is a first part of a flowchart depicting an example process 600 for determining a potential intersection using one or more example models. For example, some or all of the process 600 can be performed by one or more components in FIG. 5, as described herein. For example, some or all of the process 600 can be performed by the vehicle safety system 534.

At operation 602, the process may include inputting, into a model, top-down multi-channel data associated with an environment of a vehicle. In some examples, the operation 602 may include a vehicle computing device capturing sensor data from a lidar sensor, a radar sensor, and so on, of the vehicle 502. In some examples, the sensor data can be processed to determine top-down multi-channel data 208 of the environment. The sensor data may be received from one or more sensors on the vehicle and/or from one or more remote sensors. In some examples, a channel of the top-down multi-channel data can represent object state data (e.g., a velocity, yaw, acceleration, and so on of the object) and/or velocity information associated with the vehicle.

At operation 604, the process may include determining, by the model, a predicted velocity of an object in the environment. In some examples, the operation 604 may include a vehicle computing device implementing the model component 104 that is configured to predict, infer, estimate, or otherwise determine a velocity of the object. In various examples, top-down multi-channel data can comprise object state data associated with the object (e.g., a channel of the top-down multi-channel data can indicate a velocity of the object).

At operation 606, the process may include determining, by the model, an occupancy prediction associated with the object. In some examples, the operation 606 may include determining an occupancy grid comprising a plurality of grid points representing a probability of occupancy of pixels in the environment, and predicting an occupancy of the object based on the occupancy grid. For instance, the top-down multi-channel data can be processed by the vehicle computing device to determine whether the object in the environment is associated with one of the grid points of the occupancy grid.

At operation 608, the process may include determining an angle of the predicted velocity relative to a vehicle velocity. In some examples, the operation 608 may include comparing a magnitude and a direction of the velocity associated with the object to a magnitude and a direction of the velocity associated with the vehicle. In various examples, the vehicle computing device can determine the angle of the object relative to the vehicle to identify a rear portion of the vehicle.

At operation 610, the process may include determining, based at least in part on the occupancy prediction, an intersection probability between the object and a rear portion of the vehicle at an intersection point at a future time. In some examples, the operation 610 may include the model component 104 determining the intersection probabilities 106 based at least in part on the occupancy prediction and/or the angle between the object and the vehicle.

Figure 6B:
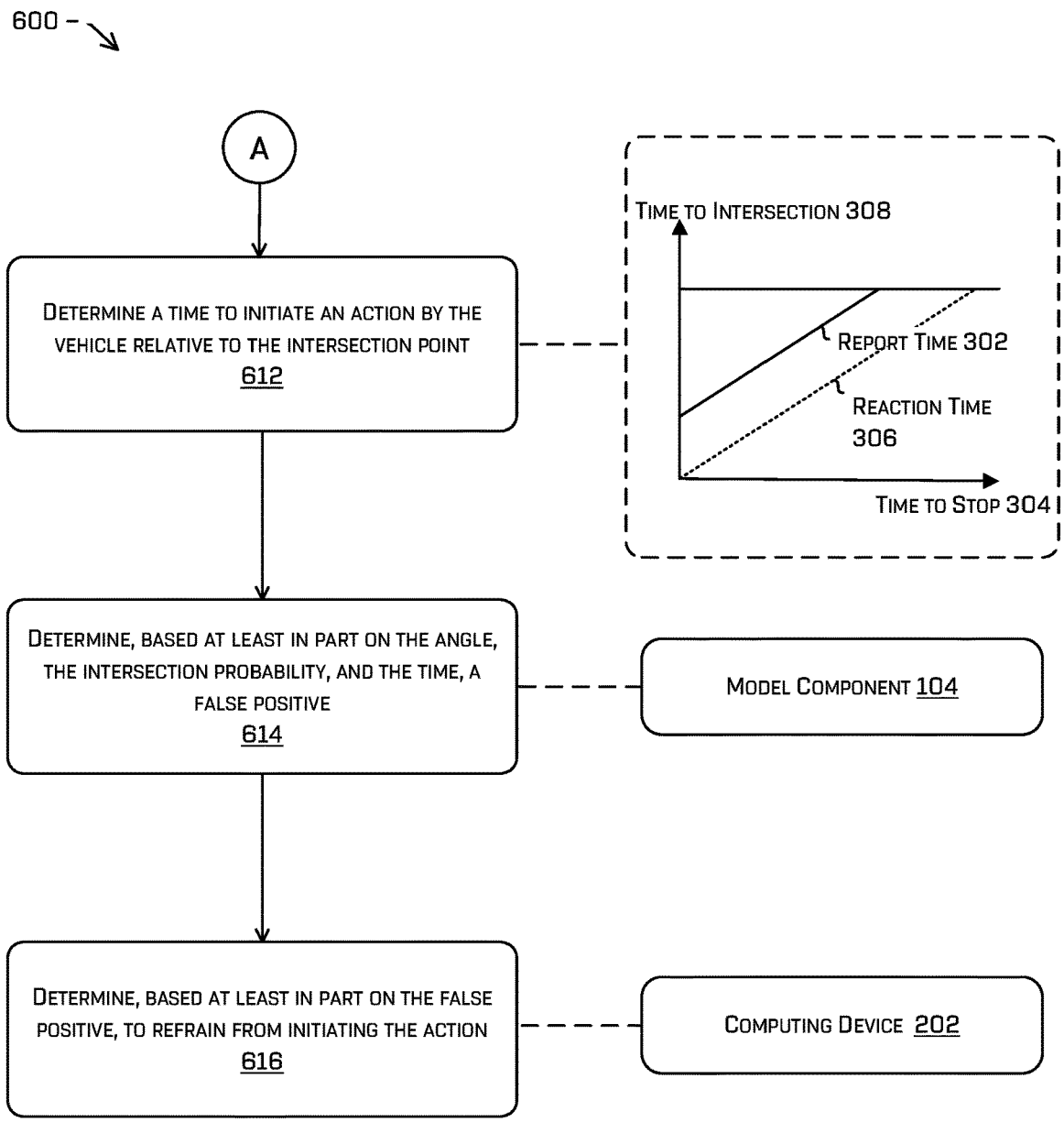
FIG. 6B is a second part of the flowchart depicting the example process for determining a potential intersection using one or more example models.

FIG. 6B is a second part of the flowchart depicting the example process for determining a potential intersection using one or more example models At operation 612, the process may include determining a time to initiate an action by the vehicle relative to the intersection point. In some examples, the operation 612 may include the vehicle safety system employed by the vehicle computing device determining a time for the vehicle to stop (e.g., a time to stop filter) to enable the vehicle safety system to delay reporting a potential intersection between the object and the vehicle. In some examples, the time to stop for the vehicle can include determining a report time (e.g., the report time 302) based at least in part on processing a time to the potential intersection, a time for the vehicle to initiate an action, and/or a reaction time. Though not illustrated in operation 612, the process 600 may additionally or alternatively comprise determining a false positive based on the distance filter described in detail above. In some examples, the action by the vehicle can comprise at least one of a braking action to cause the vehicle to brake, a steering action to cause the vehicle to steer, or an acceleration action to cause the vehicle to accelerate.

At operation 614, the process may include determining, based at least in part on the angle, the intersection probability, and the time, a false positive. In some examples, the operation 614 may include the model component 104 estimating, inferring, or otherwise determining a false positive (e.g., an indication of a potential intersection that does not occur in the future).

At operation 616, the process may include determining, based at least in part on the false positive, to refrain from initiating the action. In some examples, the operation 616 may include delaying and/or not reporting the potential intersection between the object and the vehicle by the vehicle safety system to the vehicle computing device to avoid causing the vehicle to take an action thereby preventing the vehicle from using computation resources during events that either do not result in an intersection or would result in an intersection regardless of an action by the vehicle (e.g., accelerating, braking, or steering would not avoid an object such as another vehicle from causing the intersection to the rear of the vehicle due to the object having a greater velocity that than the vehicle even if the vehicle accelerates to avoid the rear collision). In various examples, determinations of potential intersection(s) by the model component 104 can be verified as a false positive (e.g., does not occur at a future time) by processing additional input data over time that represents the object and the environment.

In various examples, process 600 may return to 602 after performing operation 616. In such examples, the vehicle may continuously monitor for potential collisions and update/modify decisions regarding whether to engage a safety system or not (which may, in at least some examples, include performing one or more maneuvers to mitigate or minimize an impact). In any of the examples described herein, the process may repeat with a given frequency and generate one or more occupancy grids associated with one or more multiple times in the future for making the determinations above.

FIGS. 6A and 6B illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. For instance, the operation 612 may be omitted and a distance filter may be used instead while in other examples the distance filter may be used in addition to the operation 612. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: inputting, into a model, top-down multi-channel data associated with an environment of a vehicle; determining, by the model, a predicted velocity of an object in the environment; determining, by the model, an occupancy prediction associated with the object; determining an angle of the predicted velocity relative to a vehicle velocity; determining, based at least in part on the occupancy prediction, an intersection probability between the object and a rear portion of the vehicle at an intersection point at a future time; determining a time to initiate an action by the vehicle relative to the intersection point, the action comprising at least one of a braking action to cause the vehicle to brake, a steering action to cause the vehicle to steer, or an acceleration action to cause the vehicle to accelerate; determining, based at least in part on the angle, the intersection probability, and the time, a false positive; and determining, based at least in part on the false positive, to refrain from initiating the action.

B: The system of paragraph A, the operations further comprising: performing a scenario comprising the object and the vehicle; determining a response to the scenario by a secondary system; and determining to refrain from sending an indication of a potential intersection to a vehicle computing device that controls the vehicle based at least in part on the response.

C: The system of paragraph A or B, wherein the occupancy prediction comprises an occupancy grid comprising a plurality of grid points representing a probability of occupancy of pixels in the environment, the operations further comprising: determining the intersection probability based at least in part on the probability of occupancy associated with a grid point of the occupancy grid.

D: The system of any of paragraphs A-C, the operations further comprising: determining a first time associated with the intersection point between the object and the rear portion of the vehicle; determining a second time associated with an amount of time associated with the vehicle stopping relative to the intersection point; determining a third time representing a reaction time of the vehicle; and determining the time to initiate the action by the vehicle based at least in part on the first time, the second time, and the third time.

E: The system of any of paragraphs A-D, the operations further comprising: determining a distance of the object to the intersection point; and determining the time to initiate the action by the vehicle based at least in part on the distance.

F: A method comprising: inputting, into a model, top-down multi-channel data associated with an environment of a vehicle; receiving, from the model, a predicted velocity of an object in the environment; determining an occupancy prediction associated with the object; determining an angle between the predicted velocity and a vehicle velocity; determining, based at least in part on the occupancy prediction, an intersection probability between the object and a region of the vehicle; and determining, by the model and based at least in part on the angle and the intersection probability between the object and the region of the vehicle, whether to send an indication of a potential intersection to a vehicle computing device, the vehicle computing device configured to control the vehicle.

G: The method of paragraph F, further comprising: determining, based at least in part on the intersection probability, to initiate an action comprising one or more of a braking action to cause the vehicle to brake, a steering action to cause the vehicle to steer, or an acceleration action to cause the vehicle to accelerate; determining a time to initiate the action by the vehicle relative to an intersection point associated with the intersection probability; and determining to refrain sending the indication of the potential intersection to the vehicle computing device further based at least in part on the time to initiate the action.

H: The method of paragraph G, further comprising: determining a distance of the object to the intersection point; and determining a time to initiate an action by the vehicle based at least in part on the distance.

I: The method of any of paragraphs F-H, further comprising: determining a first time associated with an intersection between a surface of the vehicle and the object; determining a second time associated with an amount of time required for the vehicle to stop relative to the potential intersection; determining a third time representing a reaction time; and determining whether to send the indication of the potential intersection to the vehicle computing device based at least in part on the first time, the second time, and the third time.

J: The method of paragraph I, further comprising: comparing, as a comparison, at least two of: the first time, the second time, or the third time to a time threshold; and determining whether to send the indication of the potential intersection to the vehicle computing device based at least in part on the comparison.

K: The method of any of paragraphs F-J, wherein the region comprises a rear portion of the vehicle relative to a direction of travel of the vehicle, and further comprising: performing a scenario comprising the object and the vehicle; determining a response to the scenario by a secondary system; and determining to refrain sending the indication of the potential intersection to the vehicle computing device based at least in part on the response.

L: The method of any of paragraphs F-K, further comprising: determining, by the model and based at least in part on the top-down multi-channel data, an occupancy grid comprising a plurality of grid points representing a probability of occupancy of pixels in the environment; and determining the predicted velocity of the object in the environment based at least in part on a velocity associated with a grid point of the occupancy grid.

M: The method of any of paragraphs F-L, further comprising: determining, by the model and based at least in part on the top-down multi-channel data, an occupancy grid comprising a plurality of grid points representing an occupancy of pixels in the environment; and determining the occupancy prediction based at least in part on the occupancy grid.

N: The method of any of paragraphs F-M, wherein: the top-down multi-channel data comprises object state data associated with the object.

O: The method of any of paragraphs F-N, further comprising: sending output data associated with the model to a computing device for training the model; determining, based at least in part on training data, a first loss associated with the potential intersection; determining a second loss associated with the predicted velocity and the vehicle velocity; and training the model based at least in part on the first loss and the second loss.

P: The method of any of paragraphs F-O, further comprising: determining, by the model and based at least in part on the top-down multi-channel data, a yaw or an acceleration of the object, wherein determining to refrain sending the indication of the potential intersection to the vehicle computing device is further based at least in part on the yaw or the acceleration of the object.

Q: One or more non-transitory computer-readable media storing instructions executable by one or more processors, wherein the instructions, when executed, cause the one or more processors to perform operations comprising: inputting, into a model, top-down multi-channel data associated with an environment of a vehicle; receiving, from the model, a predicted velocity of an object in the environment; determining an occupancy prediction associated with the object; determining an angle between the predicted velocity and a vehicle velocity; determining, based at least in part on the occupancy prediction, an intersection probability between the object and a region of the vehicle; and determining, by the model and based at least in part on the angle and the intersection probability, whether to send an indication of a potential intersection to a vehicle computing device, the vehicle computing device configured to control the vehicle.

R: The one or more non-transitory computer-readable media of paragraph Q, further comprising: determining, based at least in part on the intersection probability, to initiate an action comprising one or more of a braking action to cause the vehicle to brake, a steering action to cause the vehicle to steer, or an acceleration action to cause the vehicle to accelerate; determining a time to initiate the action by the vehicle relative to an intersection point associated with the intersection probability; and determining to refrain sending the indication of the potential intersection to the vehicle computing device further based at least in part on the time to initiate the action.

S: The one or more non-transitory computer-readable media of paragraph Q or R, wherein the occupancy prediction comprises an occupancy grid comprising a plurality of grid points representing a probability of occupancy of pixels in the environment, the operations further comprising: determining the intersection probability based at least in part on the probability of occupancy associated with a grid point of the occupancy grid.

T: The one or more non-transitory computer-readable media of any of paragraphs Q-S, the operations further comprising: determining a first time associated with an intersection between a surface of the vehicle and the object; determining a second time associated with an amount of time associated with the vehicle stopping relative to the potential intersection; determining a third time representing a reaction time; and determining whether to send the indication of the potential intersection to the vehicle computing device based at least in part on the first time, the second time, and the third time.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
  inputting, into a model, top-down multi-channel data associated with an environment of a vehicle;
  determining, by the model, a predicted velocity of an object in the environment;
  determining, by the model, an occupancy prediction associated with the object;
  determining an angle of the predicted velocity relative to a vehicle velocity;
  determining, based at least in part on the occupancy prediction, an intersection probability between the object and a rear portion of the vehicle at an intersection point at a future time;
  determining a distance of the object to the intersection point;
  determining, based at least in part on the distance, a time to initiate an action by the vehicle relative to the intersection point, the action comprising at least one of a braking action to cause the vehicle to brake, a steering action to cause the vehicle to steer, or an acceleration action to cause the vehicle to accelerate;
  determining, based at least in part on the angle, the intersection probability, and the time, a false positive;
  determining, based at least in part on the false positive, to refrain from initiating the action; and
  controlling, based at least in part on determining the false positive, the vehicle in the environment.

2. The system of claim 1, the operations further comprising:
performing a scenario comprising the object and the vehicle;
determining a response to the scenario by a secondary system; and
determining to refrain from sending an indication of a potential intersection to a vehicle computing device that controls the vehicle based at least in part on the response.

3. The system of claim 1, wherein the occupancy prediction comprises an occupancy grid comprising a plurality of grid points representing a probability of occupancy of pixels in the environment, the operations further comprising:
determining the intersection probability based at least in part on the probability of occupancy associated with a grid point of the occupancy grid.

4. The system of claim 1, the operations further comprising:
determining a first time associated with the intersection point between the object and the rear portion of the vehicle;
determining a second time associated with an amount of time associated with the vehicle stopping relative to the intersection point;
determining a third time representing a reaction time of the vehicle; and
determining the time to initiate the action by the vehicle based at least in part on the first time, the second time, and the third time.

5. A method comprising:
inputting, into a model, top-down multi-channel data associated with an environment of a vehicle;

receiving, from the model, a predicted velocity of an object in the environment;

determining an occupancy prediction associated with the object;

determining an angle between the predicted velocity and a vehicle velocity;

determining, based at least in part on the occupancy prediction, an intersection probability between the object and a region of the vehicle;

determining a distance of the object to an intersection point; and determining, based at least in part on the distance, a time to initiate an action by the vehicle;

determining, by the model and based at least in part on the angle, the intersection probability, and the time, whether to send an indication of a potential intersection to a vehicle computing device; and causing the vehicle computing device to control the vehicle in the environment.

6. The method of claim 5, further comprising:

determining, based at least in part on the intersection probability, to initiate an action comprising one or more of a braking action to cause the vehicle to brake, a steering action to cause the vehicle to steer, or an acceleration action to cause the vehicle to accelerate;

determining a time to initiate the action by the vehicle relative to the intersection point associated with the intersection probability; and determining to refrain sending the indication of the potential intersection to the vehicle computing device further based at least in part on the time to initiate the action.

7. The method of claim 5, wherein the time is a first time, and further comprising:

determining a second time associated with an intersection between a surface of the vehicle and the object;

determining a third time associated with an amount of time required for the vehicle to stop relative to the potential intersection;

determining a fourth time representing a reaction time; and determining whether to send the indication of the potential intersection to the vehicle computing device based at least in part on the second time, the third time, and the fourth time.

8. The method of claim 7, further comprising:

comparing, as a comparison, at least two of: the second time, the third time, or the fourth time to a time threshold; and determining whether to send the indication of the potential intersection to the vehicle computing device based at least in part on the comparison.

9. The method of claim 5, wherein the region comprises a rear portion of the vehicle relative to a direction of travel of the vehicle, and further comprising:

performing a scenario comprising the object and the vehicle;

determining a response to the scenario by a secondary system; and determining to refrain sending the indication of the potential intersection to the vehicle computing device based at least in part on the response.

10. The method of claim 5, further comprising:

determining, by the model and based at least in part on the top-down multi-channel data, an occupancy grid comprising a plurality of grid points representing a probability of occupancy of pixels in the environment; and determining the predicted velocity of the object in the environment based at least in part on a velocity associated with a grid point of the occupancy grid.

11. The method of claim 5, further comprising:

determining, by the model and based at least in part on the top-down multi-channel data, an occupancy grid comprising a plurality of grid points representing an occupancy of pixels in the environment; and determining the occupancy prediction based at least in part on the occupancy grid.

12. The method of claim 5, wherein:

the top-down multi-channel data comprises object state data associated with the object.

13. The method of claim 5, further comprising:

sending output data associated with the model to a computing device for training the model;

determining, based at least in part on training data, a first loss associated with the potential intersection;

determining a second loss associated with the predicted velocity and the vehicle velocity; and training the model based at least in part on the first loss and the second loss.

14. The method of claim 5, further comprising:

determining, by the model and based at least in part on the top-down multi-channel data, a yaw or an acceleration of the object, wherein determining to refrain sending the indication of the potential intersection to the vehicle computing device is further based at least in part on the yaw or the acceleration of the object.

15. One or more non-transitory computer-readable media storing instructions executable by one or more processors, wherein the instructions, when executed, cause the one or more processors to perform operations comprising:

inputting, into a model, top-down multi-channel data associated with an environment of a vehicle;

receiving, from the model, a predicted velocity of an object in the environment;

determining an occupancy prediction associated with the object;

determining an angle between the predicted velocity and a vehicle velocity;

determining, based at least in part on the occupancy prediction, an intersection probability between the object and a region of the vehicle; and determining a distance of the object to an intersection point;

determining, based at least in part on the distance, a time to initiate an action by the vehicle; and determining, by the model and based at least in part on the angle, and the intersection probability, and the time, whether to send an indication of a potential intersection to a vehicle computing device, the vehicle computing device configured to control the vehicle.

16. The one or more non-transitory computer-readable media of claim 15, wherein determining the time to initiate the action comprises:

determining the time to initiate the action by the vehicle relative to the intersection point associated with the intersection probability; and the operations further comprising:

determining to refrain sending the indication of the potential intersection to the vehicle computing device further based at least in part on the time to initiate the action.

17. The one or more non-transitory computer-readable media of claim 15, wherein the occupancy prediction comprises an occupancy grid comprising a plurality of grid points representing a probability of occupancy of pixels in the environment, the operations further comprising:
  determining the intersection probability based at least in part on the probability of occupancy associated with a grid point of the occupancy grid.

18. The one or more non-transitory computer-readable media of claim 15, wherein the time is a first time, and the operations further comprising:
  determining a second time associated with an intersection between a surface of the vehicle and the object;
  determining a third time associated with an amount of time associated with the vehicle stopping relative to the potential intersection;
  determining a fourth time representing a reaction time; and
  determining whether to send the indication of the potential intersection to the vehicle computing device based at least in part on the second time, the third time, and the fourth time.

19. The system of claim 1, the operations further comprising:
  determining a response to a scenario by a secondary system,
  wherein determining the false positive is based at least in part the response to the scenario by a secondary system.

20. The method of claim 5, wherein the vehicle is an autonomous vehicle.

* * * * *